Patented July 13, 1948

2,445,296

UNITED STATES PATENT OFFICE 2,445,296

PROCESS OF MANUFACTURING RESISTANCE ELEMENTS DURABLE AT HIGH TEMPERATURE AND PROOF AGAINST CHEMICAL ACTION

Axel Richard Wejnarth, Stockholm, Sweden

No Drawing. Application November 27, 1943, Serial No. 512,054. In Sweden October 20, 1942

5 Claims. (Cl. 201—76.4)

Resistance rods of silicon carbide have earlier been manufactured. However, in the said rods one has had to take a decreasing resistance at rising temperature into consideration. In the manufacture of such rods one uses binding medium and an addition of free silicon which stuff facilitates the sintering and, used in an appropriate quantity, at the same time gives the rods a suitable electric conductivity. It has appeared partly that such resistance elements endure an annealing temperature of about 1400° C. only, whereafter their conductivity is changed and the rods are destroyed, partly that they are very easily deteriorated with regard to durability and electric conductivity at contact with particles from the furnace lining, and by the action of surrounding metallic vapours or oxides, sulphides which have possibly formed, and so on.

In the manufacture of such resistance elements through sintering of possibly pressed silicon carbide having different fineness of grain other suitable stuffs may be added either prior to the sintering process, or be allowed to be formed during the said process in order to regulate in a suitable way the electric conductivity of the resistance element at different temperatures, increase its temperature of use and improve its resistance to ceramic stuffs, metals, metallic oxides or the like.

The object of the present invention is that, for such purpose, one uses carbides, nitrides, silicides, borides or oxides of one or some of the difficultly fusible metals Be, Mo, W, Ti, Va and Cr. For certain purposes it has appeared suitable that the mass also should contain nitrides, silicides, borides or oxides of the less difficultly fusible metals Mn, Fe, Ni and Co.

As the said stuffs have different electrical conductivity which may vary with the temperature and in a certain stuff even may assume positive as well as negative temperature coefficient within a certain temperature range there is a possibility of regulating, by means of one or more such stuffs, the electric conductivity of the resistance element in a suitable way in relation to the silicon carbide contained in the mass.

According to the invention one can add another carbide or silicide, but it is also possible to form a certain carbide and/or silicide by adding to the silicon carbide, before or during the sintering process, a suitable quantity of one or more metals and/or a metallic oxide or other metal compound capable of reacting with silicon carbide during binding of the added metal or of metal from the added metal compound, and then heating the mixture to sintering at desired temperature. Instead of such an absorption of metal in the grain of the silicon carbide one can form the desired compounds and/or mixtures of carbides and/or silicides by adding to the silicon carbide a mixture of metal or metal compound with a suitable quantity of carbon or silicon, preferably in a suitable mixing proportion. Since, as a rule, the silicides have lower melting points than the corresponding carbides and thus, usually already at rather low contents, cause an upper limitation of the temperature of the resistance element it appears as a general wish to try to form more carbide than silicide.

In an analogous manner one can either to the silicon carbide add one or more nitrides, oxides or borides, or form the same, before or during the sintering process, of metal or metallic oxide mixed with reducing agents through reaction with, for example, nitrogen, oxygen, borax or other compounds reacting to form nitrides, oxides or borides.

The many combinations with one or more of the respective compounds which are possible in the manufacture of resistance elements durable at high temperatures and proof against chemical action cannot be specified, but by way of example it may be stated as follows. In testing the relevant circumstances it, for example, has appeared, that manganese, chromium and wolfram form lower melting silicides than carbides, but that the said compounds of chromium are more durable than those of manganese and wolfram but at the same time more easily conducting. At a suitable combination of wolfram or of manganese, or of both of them, together with silicon carbide containing chromium one obtains a lower average electric conductivity and, all according to the testing conditions, composed carbides and/or silicides forming more durable resistance elements than an element with silicon carbide containing, for example, wolfram only. The conductivity of the carbides as well as of the silicides of chromium increasing very strongly with rising temperature and the input of such a resistance element reaching its maximum already at 1300°– 1400° C. this occurrence can be displaced towards higher temperatures or be eliminated by adding a suitable quantity of manganese or wolfram only or of both in combination. In an analogous manner one can, by a suitable mixing of, for example, the easily fusible chromium carbide and, for example, the very difficultly fusible titanic carbide, obtain sintering of the resistance element at a relatively moderate or at a very high temperature, possibly higher than the decomposition temperature of the silicon carbide, and also, through suitable combinations, stabilize the stuffs to the usual temperature, which stuffs otherwise are durable at higher temperatures only.

The invention relates more particularly to rod-shaped elements of various design and cross section, but is not restricted thereto. A product of the proposed composition sintered in some way or other can be crushed and used as heat resistance in the form of grains or powder, and also in such state form resistance elements. Such a material can as a protecting coating, which in itself forms a resistance element, be applied to resistance elements of carbon or graphite.

Having now described my invention, what I claim as new and desire to secure by Letters Patent is:

1. Electrical resistance element durable at high temperature and proof against chemical action, consisting of a sintered mass, containing as main component silicon carbide and moreover, in smaller quantity, at least one compound, belonging to the group of chromium carbide, chromium nitride, chromium silicide and chromium boride, and at least one compound, belonging to the group of beryllium carbide, beryllium nitride, beryllium silicide and beryllium boride.

2. Electrical resistance element according to claim 1, the mass containing also at least one compound, belonging to the group of manganese nitride, manganese silicide and manganese boride.

3. Electrical resistance element according to claim 1, the mass containing also at least one compound, belonging to the group of iron nitride, iron silicide and iron boride.

4. Electrical resistance element according to claim 1, the mass containing also at least one compound, belonging to the group of nickel nitride, nickel silicide and nickel boride.

5. Electrical resistance element according to claim 1, the mass containing also at least one compound, belonging to the group of cobalt nitride, cobalt silicide and cobalt boride.

AXEL RICHARD WEJNARTH.

REFERENCES CITED

The following references are of record in the file of this patent:

UNITED STATES PATENTS

| Number | Name | Date |
|---|---|---|
| 589,161 | Chaplet | Aug. 31, 1897 |
| 836,353 | Acheson | Nov. 20, 1906 |
| 1,072,414 | Arthur | Sept. 9, 1913 |
| 1,873,013 | Morgan | Aug. 23, 1932 |
| 2,013,625 | Buck | Sept. 3, 1935 |
| 2,108,794 | Bayer et al. | Feb. 22, 1938 |
| 2,109,246 | Bayer et al. | Feb. 22, 1938 |
| 2,332,241 | Lombard et al. | Oct. 19, 1943 |
| 2,406,275 | Wejnarth | Aug. 20, 1946 |

FOREIGN PATENTS

| Number | Country | Date |
|---|---|---|
| 19,175 | Austria | 1905 |
| 481,230 | France | 1916 |
| 800,855 | France | 1936 |
| 649,312 | Germany | 1937 |
| 465,313 | Great Britain | 1937 |
| 205,653 | Switzerland | 1939 |